United States Patent
Nogami et al.

(10) Patent No.: US 8,002,636 B2
(45) Date of Patent: Aug. 23, 2011

(54) STORAGE MEDIUM STORING GAME PROGRAM, GAME APPARATUS, COMMUNICATION GAME SYSTEM AND GAME CONTROL METHOD

(75) Inventors: Hisashi Nogami, Kyoto (JP); Ryuji Kobayashi, Kyoto (JP); Kunihiro Komatsu, Kyoto (JP); Toshinori Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1423 days.

(21) Appl. No.: 11/406,347

(22) Filed: Apr. 19, 2006

(65) Prior Publication Data

US 2006/0247061 A1    Nov. 2, 2006

(30) Foreign Application Priority Data

Apr. 27, 2005 (JP) .................................. 2005-129062

(51) Int. Cl.
*A63F 13/12* (2006.01)

(52) U.S. Cl. ................................. 463/42; 463/6; 463/43

(58) Field of Classification Search .................. 463/1, 6, 463/36, 39, 40, 42, 43; 434/336, 350–352; 700/91–93
See application file for complete search history.

(56) References Cited

U.S. PATENT DOCUMENTS

| | | | | |
|---|---|---|---|---|
| 5,428,528 A | * | 6/1995 | Takenouchi et al. | 463/42 |
| 5,618,045 A | * | 4/1997 | Kagan et al. | 463/40 |
| 5,695,400 A | * | 12/1997 | Fennell et al. | 463/42 |
| 6,025,801 A | * | 2/2000 | Beitel | 342/457 |
| 6,356,288 B1 | * | 3/2002 | Freeman et al. | 715/867 |
| 6,475,090 B2 | * | 11/2002 | Roelofs | 463/42 |

(Continued)

FOREIGN PATENT DOCUMENTS

| | | |
|---|---|---|
| JP | 2000-112886 | 4/2000 |
| JP | 2003-006127 | 1/2003 |
| JP | 2003-053041 | 2/2003 |

OTHER PUBLICATIONS

Vogel et al., "Consistency Control for Distributed Interactive Media", MM'01 Proceedings, Sep. 30, 2001-Oct. 5, 2001, pp. 221-230.
Examination Report dated Mar. 23, 2010 of EP No. 06 112 861.7.

*Primary Examiner* — Dmitry Suhol
*Assistant Examiner* — Jay Trent Liddle
(74) *Attorney, Agent, or Firm* — Nixon & Vanderhye P.C.

(57) ABSTRACT

A communication game system includes a parent device and at least one child device. When a predetermined operational designation has been carried out with respect to an object at the child device, for example, the child device transmits to the parent device a request for permission to perform an action corresponding to the operation. Until a conclusion as to the request is received, the child device reproduces an image in which a player character is performing a first act of the action. The parent device determines whether the action can be permitted or not in response to the request from the child device, and transmits a conclusion of determination to the child device. When receiving the conclusion by the time of end of the first act, the child device reproduces an image in which the player character is performing a second act according to the conclusion after end of the first act. On the other hand, when not receiving the conclusion by the time of end of the first act, the child device reproduces an image in which the player character is performing a third act in conformity to the first act and the second act until the reception of the conclusion.

12 Claims, 11 Drawing Sheets

U.S. PATENT DOCUMENTS

| | | | |
|---|---|---|---|
| 6,554,712 B1 * | 4/2003 | Takahashi | 463/43 |
| 6,921,336 B1 * | 7/2005 | Best | 463/32 |
| 6,966,837 B1 * | 11/2005 | Best | 463/33 |
| 2004/0180718 A1 * | 9/2004 | Uchida et al. | 463/31 |
| 2005/0026695 A1 * | 2/2005 | Tsuchiyama et al. | 463/42 |
| 2007/0093294 A1 * | 4/2007 | Serafat et al. | 463/39 |

* cited by examiner

STORAGE MEDIUM STORING GAME PROGRAM, GAME APPARATUS, COMMUNICATION GAME SYSTEM AND GAME CONTROL METHOD

CROSS REFERENCE OF RELATED APPLICATION

The disclosure of Japanese Patent Application No. 2005-129062 is incorporated herein by reference.

BACKGROUND OF THE INVENTION

1. Field of the Invention

The present invention relates to a storage medium storing a game program, a game apparatus, a communication game system and a game control method. More specifically, the present invention relates to a storage medium storing a game program for playing a communication game among a plurality of apparatuses including a parent device and at least one child device, a game apparatus, a communication game system and a game control method.

2. Description of the Related Art

Conventionally, in playing a communication game among a plurality of game apparatuses, a method for providing uniformity of communications among the game apparatuses is employed by which individual pieces of information treated by the players of the game apparatuses are collected into one game apparatus (parent device) and then are unified and sent to all the other game apparatuses (child devices). In communication between the parent device and a child device, a time lag often takes places between the instance when information on operation performed by the child device is transmitted to the parent device and the instant when the conclusion is received from the parent device. For instance, when the player of a child device performs some act on one item existing in the game, the child device connects with the parent device for a conclusion on the possibility of the act, but some delay of time occurs before the child device receives the conclusion from the parent device.

The prior art described in document 1 (Japanese Patent Application Laying-open No. 2003-6127) implements a change in the state of the game screen resulting from an operation input from the user's terminal, without waiting for a notification from the processing server. After that, if there arises any difference from the game screen on the processing server due to a time lag in communications, the state of the game screen on the user's terminal is continuously changed over a predetermined period of time so as to be the same as the state of the game screen on the processing server. In this manner, such an effort is made to give no unnatural impression to the player.

The related art of document 1 is effective in performing such an operation as moving a character in the game, but cannot be efficiently applied to events requiring an exclusive process such as a character's picking up a unique item. Thus, for an exclusive event, it is necessary to seek for permission to execute the event from the processing server and temporarily stop the operation of a character until receiving a notification from the processing server. Accordingly, even if the player has carried out an operational designation of a character, a delay in receiving notification from the processing server causes a situation in which the character does not go into action immediately, which makes the player feel discomfort. This problem becomes more prominent as the state of communication gets deteriorated. In the case of using the art in document 1 for such an exclusive event as mentioned above, even if an operation has been performed to make the character pick up an item without waiting for a notification from the processing server, for example, when a notification of rejection is transmitted from the processing server, it is necessary to carry out an operation of producing a situation in which the character cannot pick up the item. That is, when such a contradiction arises, it is impossible to provide consistency between the character's action and the player's operation, which may make the player feel distrust of the game.

SUMMARY OF THE INVENTION

Therefore, a novel storage medium storing a game program, game apparatus, communication game system and game control method are disclosed herein.

A novel storage medium storing a game program, game apparatus, communication game system and game control method is disclosed herein that can accommodate a time lag in communications while maintaining consistency between a character's action and a player's operation.

A storage medium storing a game program of a first embodiment of the invention is a storage medium storing a game program for a game apparatus serving as a child device in a communication game system including a parent device and at least one child device. The child device comprises a first storage means for storing data for displaying a game image containing a player character operated by a player. The game program allows a processor of the child device to execute a first operating state determination step, a first transmission step, a first act processing step, a first reception step, and a second act processing step. In the first operating state determination step, it is determined whether or not the player has carried out a predetermined operational designation. In the first transmission step, when it is determined in the first operating state determination step that the predetermined operational designation has been carried out, a request is transmitted to the parent device for permission to perform an action corresponding to the predetermined operational designation. In the first act processing step, an image of the player character performing a first act is displayed according to the predetermined operational designation until a conclusion transmitted from the parent device is received according to the request transmitted in the first transmission step. In the first reception step, the conclusion transmitted from the parent device is received according to the request transmitted in the first transmission step. In the second act processing step, after the conclusion is received in the first reception step, an image of the player character performing a second act is displayed according to the conclusion.

More specifically, the game program in the storage medium is a game program for performing a communication game on the game apparatus (10: reference numeral corresponding to that in the embodiments described later. The same applies to the following numerals.) serving as a child device in the communication game system containing the parent device and at least one child device, and is executed by the processor (42) of the game apparatus. The first storage means (28, 48) of the child device stores data for displaying a game image containing the player character (90). In the first operating state determination step (S59), it is determined whether or not the player has carried out a predetermined operational designation. It is determined whether or not any operation has been carried out for designating a predetermined action to be performed by the player character based on operational data from the operating switch or touch panel, for example. In the first transmission step (S75), when it is determined that the predetermined operational designation has been carried out, a request is transmitted to the parent device for permission to perform an action corresponding to the predetermined operational designation. In the embodiments, the transmitted request data includes a communication ID of the child device as well as the request for permission to perform an action corresponding to the predetermined operational designation. If the action corresponding to the predetermined operational designation is to be performed on an object, the request data also includes an identification code of the object. In the first act processing step (S77), the image of the player character performing the first act corresponding to the predetermined operational designation is displayed until the conclusion transmitted from the parent device is received according to the request. In the embodiments, the image of the first act is displayed on the basis of animation data with a longer reproduction time than a normal time lag in communications. Also, the first act is an initial act in the action corresponding to the predetermined operational designation and maintains consistency even if the request for the action is rejected. In the first reception step (S79), the conclusion transmitted from the parent device is received according to the transmitted request. In the second act processing step (S91, S93, S95), after the reception of the conclusion, the image of the player character performing the second act corresponding to the conclusion is displayed. In the embodiments, the second act is an act following the first act in the action corresponding to the predetermined operational designation, and the image of the second act is displayed on the basis of animation data for the second act.

According to the embodiment, after the request for permission to perform the action corresponding to the player's operational designation is transmitted to the parent device, the player character performs the first act until a conclusion is received from the parent device. Then, upon reception of the conclusion from the parent device, the player character performs the second act corresponding to the conclusion. This makes it possible to maintain consistency in action corresponding to the player's operation while accommodating a time lag in communications. Accordingly, even in an exclusive event, it is possible to avoid such a situation in which the player character has to pause his/her action waiting for the parent device's conclusion, thereby offering a communication game that causes no discomfort to the player.

In an aspect, the game program in the storage medium allows the processor of the child device to further execute a reception determination step and a third act processing step. In the reception determination step, it is determined whether or not the conclusion has been received from the parent device by the time the first act has been completed. In the third act processing step, upon completion of the first act in the first act processing step, when it is determined in the reception determination step that the conclusion has been not received, an image of the player character performing a third act in conformity to the first act and the second act is displayed until reception of the conclusion.

More specifically, in the reception determination step (S85, S87), it is determined whether or not the conclusion has been received from the parent device by the time the first act has been completed. In the third act processing step (S89), upon completion of the first act, when it is determined that the conclusion has been not received, an image of the player character performing a third act in conformity to the first act and the second act is displayed until reception of the conclusion. In the embodiments described later, the third act is an act such as linking the first act with the second act, and the image is displayed on the basis of animation data for the third act until the conclusion is received. Thus, if no conclusion is received from the parent device by the time of completion of the first act, the player character performs the third act until the conclusion is received, which makes it possible to maintain consistency in the action corresponding to the player's operation even if a time lag increases due to a deterioration in communication state.

In an embodiment, in the second act processing step, displayed is an image of the player character performing an act that is different between when a conclusion indicative of permission is received and when a conclusion indicative of rejection is received.

That is, the player character performs an act as second act that is different between when the conclusion indicative of permission is received and when the conclusion indicative of rejection is received. With this, it is possible to maintain consistency in the action corresponding to the player's operation and also secure exclusive properties of an event with consistency in the action with the other game apparatuses.

A game apparatus of the second embodiment of the present invention is a game apparatus serving as a child device in a communication game system including a parent device and at least one child device. The game apparatus comprises a first storage means, a first operating state determination means, a first transmission means, a first act processing means, a first reception means and a second act processing means. The first storage means stores data for displaying a game image containing a player character operated by a player. The first operating state determination means determines whether or not a predetermined operational designation has been carried out by the player. When the first operating state determination means has determined that the predetermined operational designation has been carried out, the first transmission means transmits to the parent device a request for permission to perform an action corresponding to the predetermined operational designation. The first act processing means displays an image of the player character performing a first act according to the predetermined operational designation by the time a conclusion transmitted from the parent device has been received according to the request transmitted by the first transmission means. The first reception means for receiving the conclusion transmitted from the parent device according to the request transmitted by the first transmission means. After the conclusion has been received by the first reception means, the second act processing means displays an image of the player character performing a second act according to the conclusion.

The second embodiment is a game apparatus that corresponds to the above mentioned storage medium storing a game program of the first invention. In the second invention, as in the case with the above described first invention, it is possible to accommodate a time lag in communications while maintaining consistency in the action corresponding to the player's operation. This makes it possible to provide a communication game that causes no discomfort to the player.

A communication game system of the third embodiment of the present invention is a communication game system containing a parent device and at least one child device. The child device includes a first storage means, a first operating state determination means, a first transmission means, a first act processing means, a first reception means and a second act processing means. The first storage means stores data for displaying a game image containing a player character operated by a player. The first operating state determination means determines whether or not a predetermined operational designation has been carried out by the player. When it is determined by the first operating state determination means that the predetermined operational designation has been carried out, the first transmission means transmits to the parent device a request for permission to perform an action corresponding to the predetermined operational designation. The first act processing means displays an image of the player character performing a first act according to the predetermined operational designation by the time the conclusion transmitted from the parent device has been received according to the request transmitted by the first transmission means. The first reception means receives a conclusion transmitted from the parent device according to the request transmitted by the first transmission means. After the conclusion has been received by the first reception means, the second act processing means displays an image of the player character performing a second act according to the conclusion. The parent device includes a second reception means, a permission determination means, and a second transmission means. The second reception means receives the request from the child device. The permission determination means determines whether or not to give permission to the request received by the second reception means. The second transmission means transmits to the child device the conclusion determined by the permission determination means.

In the third embodiment, the communication game system includes the parent device and at least one child device. The child device is the game apparatus of the second embodiment of the invention corresponding to the above described storage medium storing a game program of the first embodiment, and a duplicate description about this is omitted here. The second reception means (42, 64, S9) of the parent device receives the request from the child device. The permission determination means (42, S13) determines whether or not to give permission to the received request. In the embodiments, it is determined whether the request is already permitted or not on the basis of an item flag. The second transmission means (42, 64, S21 S23, S25, S27, S35) transmits the determined conclusion. Accordingly, as in the case with the above described storage medium storing a game program of the first embodiment of the invention, it is possible to accommodate a time lag in communications while maintaining consistency in the action corresponding to the player's operation. This makes it possible to provide a communication game that causes no discomfort to the player.

In an aspect, the child device further includes a reception determination means and a third act processing means. The reception determination means determines whether or not the conclusion has been received from the parent device by the time the first act has been completed. Upon completion of the first act by the first act processing means, when the reception determination means has determined that no conclusion has been received, the third act processing means displays an image of the player character performing a third act in conformity to the first act and the second act until the conclusion is received.

That is, if no conclusion is received from the parent device by the time of completion of the first act, the player character performs the third act until reception of the conclusion. This makes it possible to maintain consistency in the action corresponding to the player's operation even if the communication state deteriorates.

In an embodiment, when the second reception means has received a same request from a plurality of the child devices in a case where permission can be given to the request, the permission determination means selects a child device to be given the permission and decides to reject the request form the other child devices. The second transmission means transmits a conclusion indicative of permission to the child device selected by the permission determination means and transmits a conclusion indicative of rejection to the other child devices. The second act processing means displays an image of the player character performing an act that is different between when permission is received and when rejection is received.

More specifically, when the same request is received from a plurality of the child devices in the case where permission can be given to the request, the permission determination means (42, S13, S17, S19) of the parent device selects a child device to be given the permission and decides to reject the request from the other child devices. The second transmission means (42, 64, S21, S23) of the parent device transmits a conclusion indicative of permission (action permission data) to the selected child device and transmits a conclusion indicative of rejection (action rejection data) to the other child devices. The second act processing means (42, S91, S93, S95) of the child device displays an image of the player character performing an act that is different between when permission is received and when rejection is received. In this manner, when the same request is received form the plurality of child device, only one of the child devices is permitted for the request. Each of the child devices makes the player character perform an act as second act that is different between when the conclusion indicative of permission is received and when the conclusion indicative of rejection is received. Thus, as in the case with the above mentioned storage medium storing a game program of the first embodiment of the invention, it is possible to maintain consistency in the action corresponding to the player's operation and also secure exclusivity of an event with consistency in the action with the other game apparatuses.

In another aspect, the parent device further includes a second storage means, a second operating state determination means, and a fourth act processing means. The second storage means stores data for displaying a game image containing a player character operated by a player. The second operating state determination means determines whether or not the predetermined operational designation has been carried out by the player. When the second operating state determination means has determined that the predetermined operational designation has been carried out, the fourth act processing means displays an image of the player character performing the first act and the second act corresponding to the predetermined operational designation. When the second operating state determination means has determined that the predetermined operational designation has been carried out and the second reception means has received a same request as the predetermined operational designation, the permission determination means decides to reject the received request. The second transmission means transmits to the child device a conclusion indicative of rejection determined by the permission determination means. The fourth act processing means displays an image of the player character performing an act corresponding to the case in which the permission is received as the second act.

More specifically, the second storage means (28, 48) of the parent device stores data for displaying a game image containing a player character. The second operating state determination means (42, S15) determines whether or not the player has carried out the predetermined operational designation, based on operational data from the operating switch or touch panel, for example. When the predetermined operational designation has been carried out in the parent device, the fourth act processing means (42, S29, S31) displays an image of the player character performing the first act and the second act corresponding to the predetermined operational designation, as in the case with the child device. When the predetermined operational designation has been carried out and the same request as the designation of predetermined operation has been received from the child device, the permission determination means (42, S15) decides to reject the received request. The second transmission means (42, 64, S27) transmits to the child device a conclusion indicative of rejection. The fourth act processing means displays an image of the player character performing an act corresponding to the case in which the permission is received as the second act. In this manner, when a predetermined operational designation has been carried out the parent device, if a request for the same designation has been received from the child device, the child device's request is rejected and the parent device's operation is implemented by priority. This makes it possible to select easily the game apparatus to be given permission and provide consistency in the action corresponding to the player's operation between the parent device and the child device, thereby ensuring exclusive properties of an event.

A storage medium storing a game program of the fourth embodiment of the invention according to the present invention is a storage medium storing a game program to be executed by a game apparatus in a communication game system containing a game apparatus and in which one of the game apparatuses serves as apparent device and at least another game apparatus serves as a child device. The game apparatus comprises a storage means for storing data for displaying a game image containing a player character operated by a player. The game program allows a processor of the game apparatus serving as the child device to execute a first operating state determination step, a first transmission step, a first act processing step, a first reception step, and a second act processing step. In the first operating state determination step, it is determined whether the player has carried out a predetermined operational designation or not. In the first transmission step, when it has been determined in the first operating state determination step that the predetermined operational designation has been carried out, a request for permission to perform an action corresponding to the predetermined operational designation is transmitted to the parent device. In the first act processing step, an image of the player character performing a first act according to the predetermined operational designation is displayed by the time a conclusion transmitted form the parent device has been received according to the request transmitted in the first transmission step. In the first reception step, the conclusion transmitted from the parent device according to the request transmitted in the first transmission step is received. In the second act processing step, after the conclusion has been received in the first reception step, an image of the player character performing a second act according to the conclusion is displayed. The game program also allows the processor of the game apparatus serving as the parent device to execute a second reception step, a permission determination step, and a second transmission step. In the second reception step, the request from the child device is received. In the permission determination step, it is determined whether or not to give permission to the request received in the second reception step. In the second transmission step, the conclusion determined in the permission determination step is transmitted to the child device.

That is, the game program in the storage medium is a game program for a communication game system containing a plurality of game apparatuses. In the communication game system, one of the game apparatuses serves as parent device and at least another game apparatus serves as child device. With the game program in the storage medium, as in the case with the above mentioned communication game system of the third embodiment of the invention, it is possible to accommodate a time lag in communications while maintaining consistency in the action corresponding to the operational designation. This implements a communication game that causes no discomfort to the player.

A game control method of the fifth embodiment of the present invention is a game control method for game apparatus serving as a child device of a communication game system containing a parent device and at leas tone child device comprising a first storage means for storing data for displaying a game image containing a player character operated by a player. This game control method includes a first operating state determination step, a first transmission step, a first act processing step, a first reception step, and a second act processing step. In the first operating state determination step, it is determined whether the player has carried out a predetermined operational designation or not. In the first transmission step, when it has been determined in the first operating state determination step that the predetermined operational designation has been carried out, a request for permission to perform an action corresponding to the predetermined operational designation is transmitted to the parent device. In the first act processing step, an image of the player character performing a first act according to the predetermined operational designation is displayed by the time a conclusion transmitted from the parent device has been received according to the request transmitted in the first transmission step. In the first reception step, the conclusion transmitted from the parent device according to the request transmitted in the first transmission step is received. In the second act processing step, after the conclusion has been received in the first reception step, an image of the player character performing a second act according to the conclusion is displayed.

A game method of the sixth embodiment of the present invention is a game control method for a game apparatus in a communication game system that contains a plurality of game apparatuses, each of them comprising a storage means for storing data for displaying a game image containing a player character operated by a player and where one of the game apparatuses serves as a parent device and at least another one of the game apparatuses serves as a child device. If the game apparatus serves as the child device, the game control method includes a first operating state determination step, a first transmission step, a first act processing step, a first reception step, and a second act processing step. In the first operating state determination step, it is determined whether or not the player has carried out a predetermined operational designation. In the first transmission step, when it has been determined in the first operating state determination step that the predetermined operational designation has been carried out, a request for permission to perform an action corresponding to the predetermined operational designation is transmitted to the parent device. In the first act processing step, an image of the player character performing a first act according to the predetermined operational designation is displayed by the time a conclusion transmitted from the parent device has been received according to the request transmitted in the first transmission step. In the first reception step, the conclusion transmitted from the parent device according to the request transmitted in the first transmission step is received. In the second act processing step, after the conclusion has been received in the first reception step, an image of the player character performing a second act according to the conclusion is displayed. If the game apparatus serves as the parent device, the game control method includes a second reception step, a permission determination step, and a second transmission step. In the second reception step, the request from the child device is received. In the permission determination step, it is determined whether or not to give permission to the request received in the second reception step. In the second transmission step, the conclusion determined in the permission determination step is transmitted to the child device.

The game control methods of the fifth and sixth embodiments bring about the same advantages of the above mentioned first and fourth embodiments.

According to the embodiments of the present invention, after transmitting to the parent device a request for permission to perform an action corresponding to the player's operational designation, the child device makes the player character perform the first act until reception of a conclusion from the parent device, and then makes the player character perform the second act according to the conclusion received from the parent device. This makes it possible to accommodate a time lag in communications while maintaining consistency in the action to the player's operation. Consequently, it is possible to provide a communication game that causes no discomfort to the player.

Furthermore, if no conclusion is received from the parent device by the time of completion of the first act, the player character performs the third act until reception of a conclusion. This makes it possible to maintain consistency in the action corresponding to the player's operation even if the communication state deteriorates and a time lag increases.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
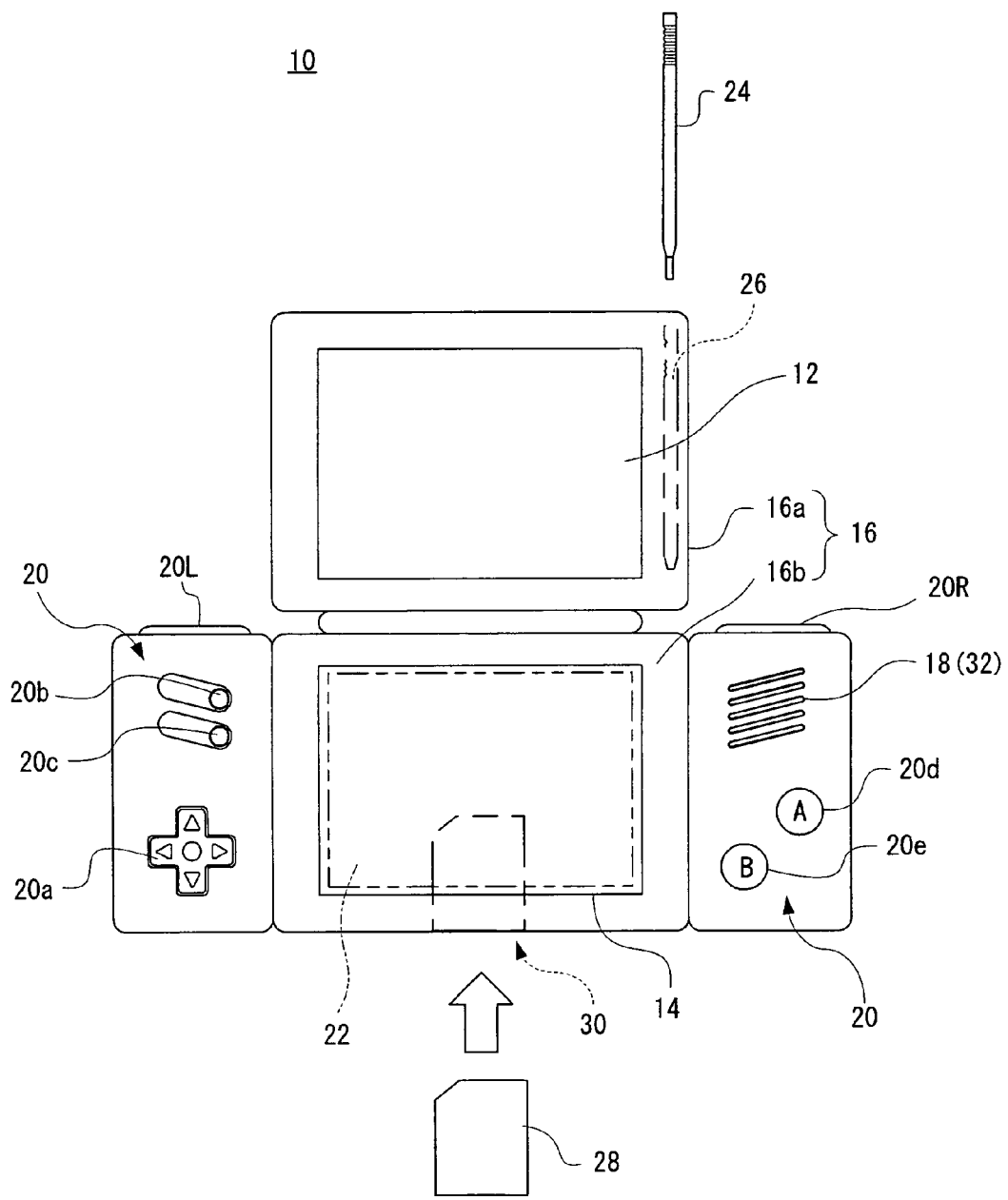
FIG. 1 is an outline view showing one example of a game apparatus used in a communication game system as one embodiment of the present invention.

Referring to FIG. 1, the game apparatus 10, the first embodiment of the present invention, includes a first liquid crystal display (LCD) and a second LCD 14. The LCD 12 and LCD 14 are stored in a housing 16 in such a manner as to be arranged in predetermined positions. For example, the housing 16 is composed of an upper housing 16a and a lower housing 16b, the LCD 12 is stored in the upper housing 16a, and the LCD 14 is stored in the lower housing 16b. Therefore, the LCD 12 and LCD 14 are vertically (longitudinally) arranged close to each other.

In this embodiment, LCDs are employed as display. Instead of the LCDs, EL (Electronic Luminescence) displays and plasma displays may be utilized.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by an operator (player), instructing a moving direction of a cursor, and so forth by operating any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (L button) 20L and the action switch (R button) 20R are formed by the push button, and the L button 20L and the R button 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In conclusion to an operation of depressing, stroking, touching or tapping with a stick 24, a pen (stylus pen), or a finger (hereinafter, referred to as "stick 24, etc.") on a top surface (detection surface) of the touch panel 22, the touch panel 22 detects coordinates (touch coordinate) of position of operation (i.e. touch input) by means of the stick 24, etc. and outputs coordinate data corresponding to the detected touch coordinates.

Besides, a resolution of the display surface of the LCD 14 is 256 dots×192 dots, and a detection accuracy (operating surface) of the touch panel 22 is also rendered 256 dots×192 dots in correspondence to the resolution of the display surface (this is the same or approximately the same as for the LCD 12). Although FIG. 1 shows the touch panel 22 in a size different from the LCD 14 for the sake of clarity, the display screen of the LCD 14 is the same in size as the operating surface of the touch panel 22. In addition, detection accuracy of the detection surface of the touch panel 22 may be lower than the resolution of the display surface of the LCD 14, or higher than it.

It is possible to display different game images (game screens) on the LCD 12 and the LCD 14. For example, in a racing game, a screen viewed from a driving seat is displayed on the one LCD, and a screen of entire race (course) may be displayed on the other LCD. Moreover, in a RPG, it is possible to display characters such as map and player character on one LCD (the LCD 12 in this embodiment) and display items possessed by a player character on the other LCD (the LCD 14 in this embodiment). Furthermore, by using the two LCD 12 and LCD 14 as one screen, it is possible to display a big monster (enemy character) to be defeated by the player character.

This allows the player to point at (specify) or make active (move) character images displayed on the LCD 14, such as player characters, enemy characters, item characters, text information and icons, or select a command, by operating the touch panel 22 with the stick 24, etc.

Besides, depending on the kind of the game, it is possible to perform other various input designations. Examples are to select or operate an icon displayed on the LCD 14 and to give a coordinate input instruction.

Thus, the game apparatus 10 has the LCD 12 and the LCD 14 as display: portion of two screens, and by providing the touch panel 22 on an upper surface of any one of them (LCD 14 in this embodiment). Accordingly, the game apparatus 10 has the two screens (LCD 12, 14) and the two operating portions (20, 22).

Furthermore, in this embodiment, the stick 24 can be inserted into a housing portion (housing slot) 26 provided in proximity to a side surface (right side surface) of the upper housing 16a, for example, and taken out therefrom as necessary. However, in a case of not preparing the stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Although not illustrated in FIG. 1, a speaker 32 (see FIG. 2) is provided at a position corresponding to the sound hole 18 inside the lower housing 16b.

Furthermore, although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
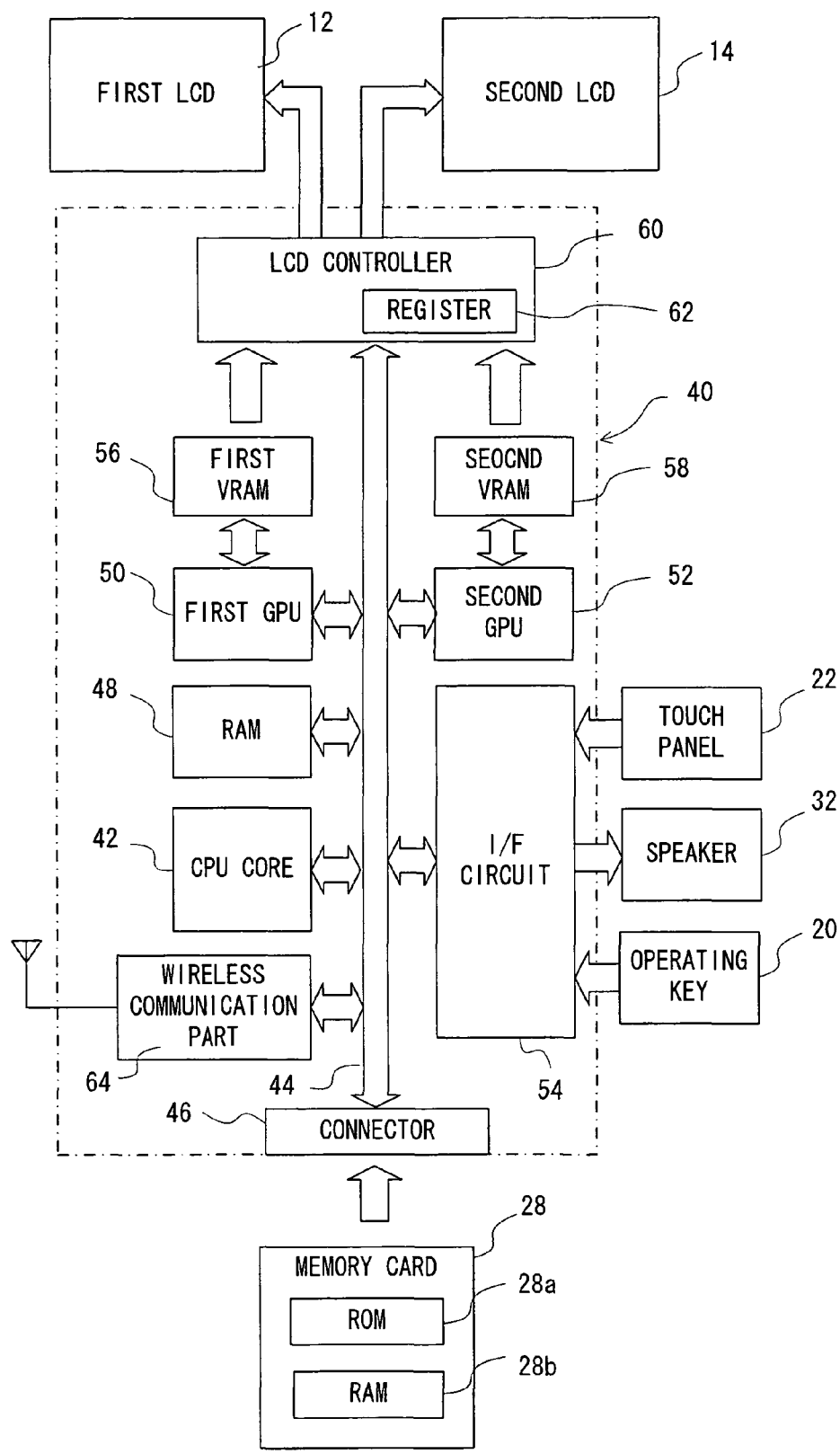
FIG. 2 is a block diagram showing an electrical configuration of the game apparatus of FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60 and a wireless communication part 64.

The connector 46 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image (character image, background image, item image, icon (button) image, etc.), data of sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data and flag data) generated or obtained according to a progress of the game in the RAM 48.

It is noted that such the game program, the image data, the sound data, etc. are loaded from the ROM 28a entirely at a time, or partially and sequentially as necessary so as to be stored (loaded) into the RAM 48.

Additionally, the ROM 28a of the memory card 28 stores some programs for applications other than games, and image data required for execution of those applications. Also, the ROM 28a may store sound (music) data where necessary. In this case, the game apparatus 10 executes those applications.

Each of the GPU 50 and the GPU 52 forms a part of a rendering means, is constructed by a single chip ASIC, for example, and receives a graphics command (image generating command) from the CPU core 42 to generate game image data according to the graphics command. It is noted that the CPU core 42 provides each of the GPU 50 and the GPU 52 with an image generating program (included in the game program) required for generating the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. Also, the CPU core 42 reads image data required for graphic drawing from the RAM 48 and writes it into the first VRAM 56 and the second VRAM 58 via the GPU 50 and the GPU 52. The GPU 50 accesses the VRAM 56 to generate the game image data for graphics display, and stores it in a drawing buffer of the VRAM 56. The GPU 52 accesses the VRAM 58 to generate the game image data for graphics drawing, and stores it in the drawing buffer of the VRAM 58. The drawing buffer may be a frame buffer or a line buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the image data generated by the GPU 50 to the LCD 12, and outputs the game image data generated by the GPU 52 to the LCD 14 in a case where the data value of the register 62 is "0". Furthermore, the LCD controller 60 outputs the game image data generated by the GPU 50 to the LCD 14, and outputs the game image data generated by the GPU 52 to the LCD 12 in a case where the data value of the register 62 is "1".

Besides, the LCD controller 60 reads out game image data directly from the VRAM 56 and the VRAM 58, and reads out game image data from the VRAM 56 and the VRAM 58 via the GPU 50 and the GPU 52.

Additionally, the VRAM 56 and the VRAM 58 may be provided in the RAM 48, or their drawing buffer and Z buffer may be provided in the VRAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, the operation data (coordinate data) from the touch panel 22 is input to the CPU core 42 via the I/F circuit 54. In addition, the CPU core 42 reads the sound data necessary for the game such as a game music (BGM), a sound effect or voices of a game character (onomatopoeic sound), etc. from the RAM 48, and outputs it from the speaker 32 via the I/F circuit 54.

The wireless communication part 64 is a communication tool for transmitting/receiving data to/from another game apparatus 10 in a short-distance wireless manner, for example. More specifically, the wires communication part 64 modulates communication data to a wireless signal and transmits it to the other end through an antenna, and also receives a wireless signal from the other game apparatus 10 through the same antenna and demodulates it to communication data.

Figure 3:
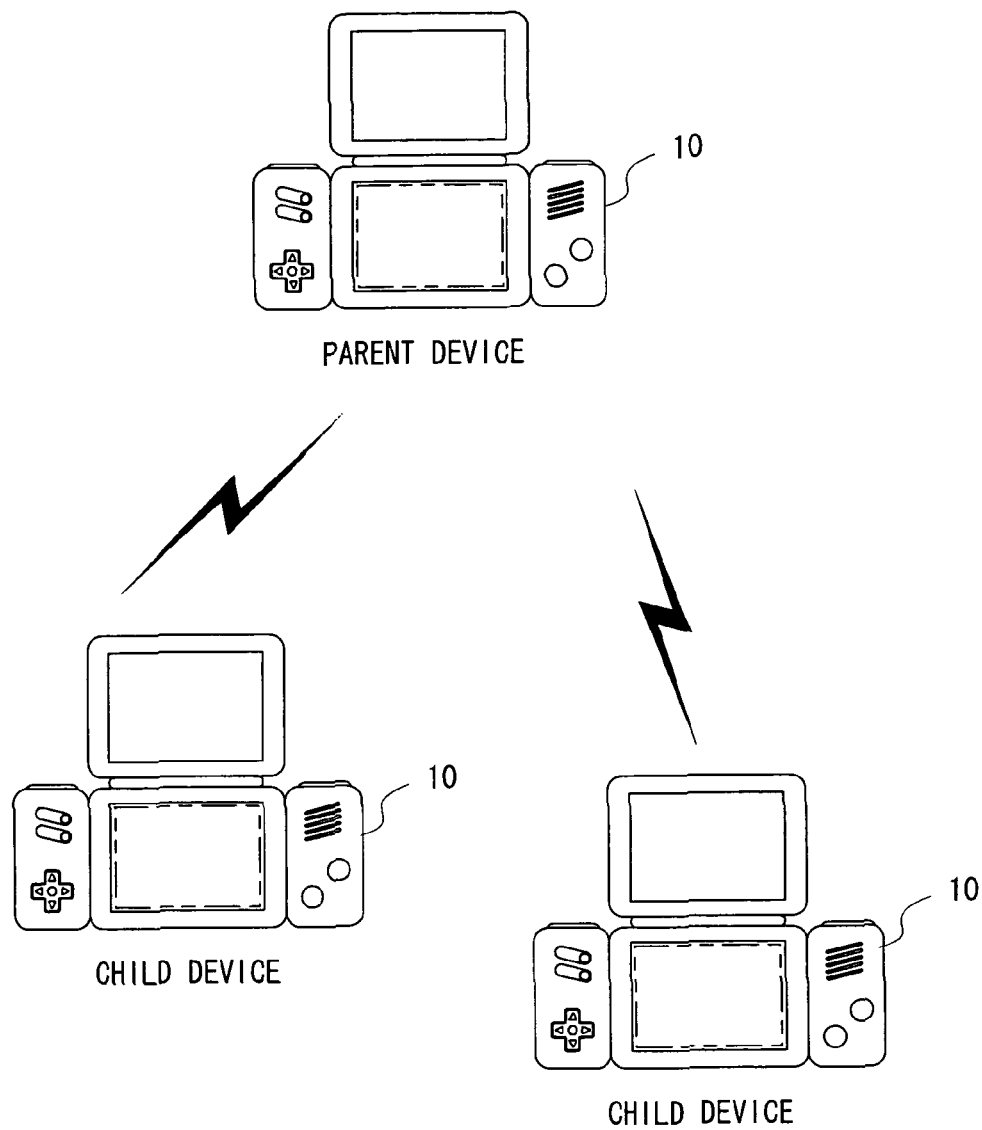
FIG. 3 is an illustrative view showing one example of communication game system using the game apparatus of FIG. 1 embodiment.

A communication game system of this embodiment is composed of a plurality of game apparatuses 10 as stated above. As shown in FIG. 3, a communication game is played by the plurality of game apparatuses 10 that transmit or receive communication data among them. To perform a communication game, the individual game apparatuses 10 need to serve as apparent device or a child device. Each of the players can select whether his/her device will be a parent device or child device through a selection screen, for example. In serving as a parent device, the game apparatus 10 searches for a child device existing within a communicable area and establishes connection with it. On the other hand, in serving as a child device, the game apparatus 10 searches for a parent device that exists within a communicable area and can join the game, and then connects to it.

In addition, it is possible to provide only the parent device with a memory card 28 and bring the child device into operation by downloading a child device program form the memory card 28 of the parent device. That is, the child device can play the communication game according to the downloaded child device program even if it has no memory card 28 attached.

In this communication game system, wireless communications may be carried out on the basis of time division multiple access. Each of the game apparatuses 10 is assigned a time slot during one cycle of communication, and transmits its own data in the assigned time slot. For such a technology of wireless communications between the parent device and child device, refer to detailed disclosures in Japanese Patent Laying-open No. 2004-135778 and Japanese Patent Laying-open No. 2004-136009 filed by the applicant of the present invention. In addition, each of the game apparatuses 10 may be connected via a wireless LAN, for instance.

Figure 4:
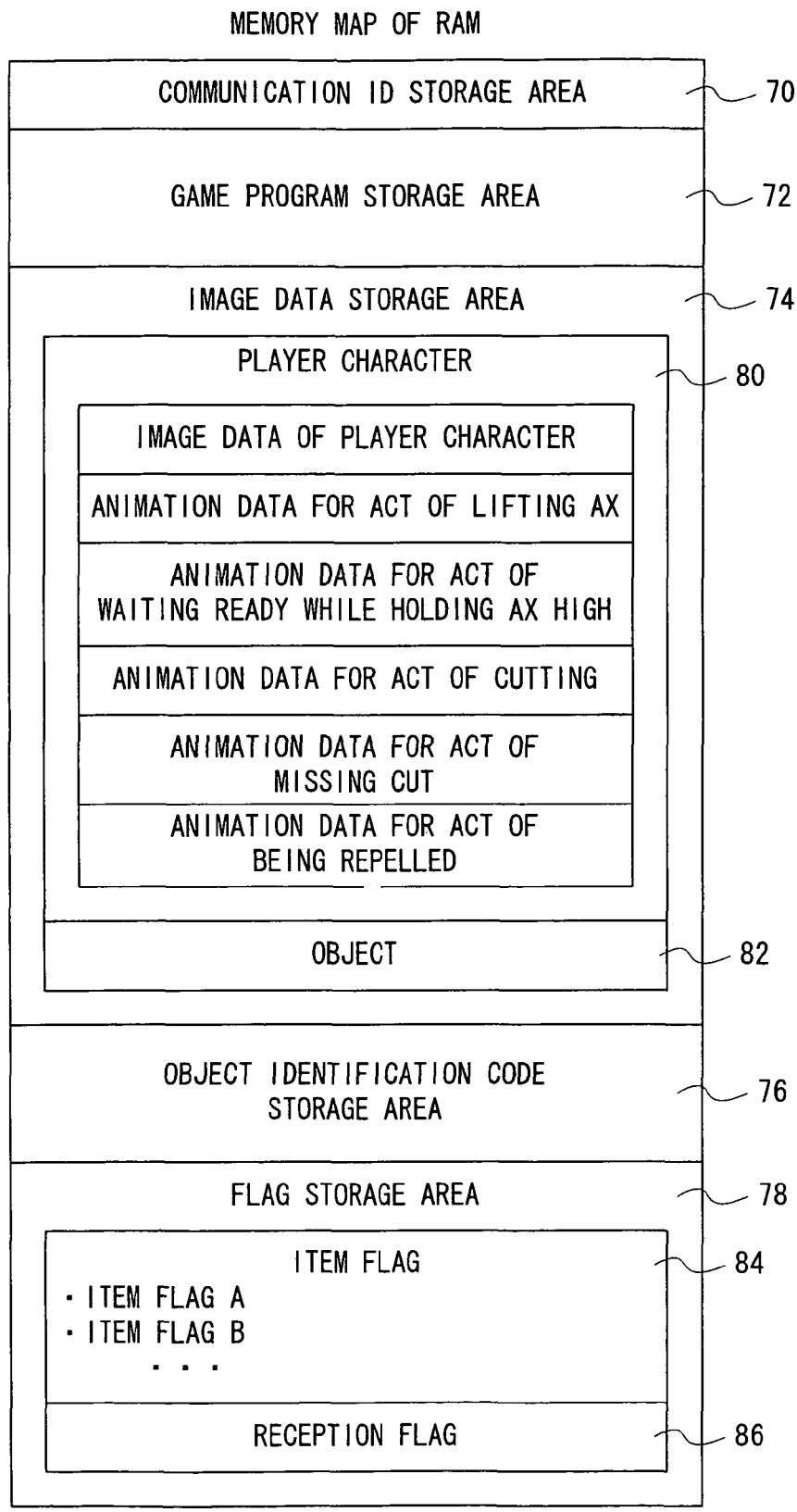
FIG. 4 is an illustrative view showing one example of a memory map of a RAM.

FIG. 4 shows one example of a memory map of the RAM 48. The RAM 48 includes a communication ID storage area 70, a game program storage area 72, an image data storage area 74, an object identification code storage area 76, and a flag storage area 78, etc. FIG. 4 indicates only a part of the memory map, and thus the RAM 48 stores further various kinds of data required for the progress of the game.

The communication ID storage area 70 stores a communication ID as identification information for this apparatus in the communication game. This area also stores identification information for the other end's game apparatus 10 in communication with this apparatus.

The game program storage area 72 stores a game program for performing the communication game of this embodiment that is read from the ROM 28*a* of the memory card 28.

The image data storage area 74 stores image data for generating a game image. The image data storage area 74 includes a player character data storage area 80 and an object data storage area 82, etc. This area also stores image data for landforms and backgrounds constituting a game space.

The object here means a subject of effect of a predetermined action performed by the player character, and also denotes an object that generates an event requiring an exclusive process. The object is positioned at a predetermined place in the game space or moves through the game space. For an example of object of communication game of this embodiment, a wood object is provided at a predetermined place in the game space. It is necessary to perform an action on the object in the game space shared by a plurality of players in an exclusive manner. More specifically, the wood object can be cut only once with an ax held by a player object. Once one player character has cut the wood object, the other player objects cannot cut the wood object. In this manner, the exclusive event permits only one of the plurality of player characters sharing the game space to perform his/her action on the object. Another example of exclusive event is picking up an item arranged in a predetermined place in the game space. One item can be picked up and held by only one player character. Before execution of an exclusive event, it is required to verify whether the action is permitted or rejected. In this embodiment, the parent device determines whether or not the action can be performed on such an object as stated above for provision of exclusivity, and thus the child device transmits to the parent device a request for or inquiry about the possibility of performance of the action. That is, the child device transmits to the parent device a request for permission to perform the action corresponding to a predetermined operational designation.

The player character data storage area 80 stores image data for generating and displaying an image of the player character.

This area also stores animation data for displaying a predetermined action performed by the player character. FIG. 4 shows, as an example, animation data of the player character who is performing an action of cutting an object with an ax. Animation data for an act of lifting the ax means animation data for displaying the player character who is lifting the ax from a state of just holding it. This animation data is reproduced if an operational input is given for a designation of the action for cutting the object with the ax. Animation data for an act of waiting ready while holding the ax high is animation data for displaying an act performed by the player character who is waiting for his/her timing in banging down the ax from its up position. This animation data is reproduced when no conclusion of verification is received during reproduction of the act of raising the ax. Animation data for an act of cutting the object is animation data for displaying an act performed by the player character who is banging down the ax from its up position and cutting the object. This animation data is reproduced in the case where it is possible or permitted to cut the object. Animation data for an act of missing the cutting is animation data for displaying an act performed by the player character who banged down the ax but missed cutting the object. This animation data is reproduced in the case where it is rejected to cut the object or there exists no object surrounding the player character. Animation data for an act of being repelled is animation data for displaying an act performed by the player character who banged down the ax but was repelled by the object. This animation data is reproduced if it is impossible to cut the object with the ax. Although not illustrated, this storage area also stores animation data for displaying other actions.

The object data storage area 82 stores image data for generating and displaying an image of such an object as stated above. For example, in the case of the above mentioned wood object, this storage area stores image data for the scenes before and after the cutting.

The object identification code storage area 76 stores an identification code (identification number) for each object existing in the game space. This storage area further stores positional data of the object in the game space and image designation data, etc., in association with the identification code.

The flag storage area 78 includes an item flag storage area 84 and a reception flag storage area 86, etc. The item flag storage area 84 stores an item flag indicating the state of the object in association with the object identification code, for instance. If the item flag is at "0", for example, the object is in a state where it is possible to make a predetermined action take effect on it. If the item flag has value of "1", the object is in a state where it is impossible to make a predetermined action affect it. As an example, if the flag is at "0", the above stated wood object can be cut, and if the flag is at "1", the object is already cut. Besides, in the case of an item capable of being picked up, it the flag is at "0", it can be picked up, and if the flag is at "1", it is already picked up.

The reception flag storage area 86 stores a reception flag for indicating whether a conclusion of verification or inquiry of the possibility of performance of a predetermined action or a conclusion as to a request for permission to perform an action corresponding to a predetermined operational designation, is received or not from the parent device. The reception flag is set at "0" in its initial state. The reception flag is set to "1" when the conclusion to the request is received, and is set to "0" when no conclusion is received.

In this embodiment, one action performed by the player character is divided into two portions of a first act and a second act, for example, and is stored as animation data indicative of the individual acts. The first act is an initial portion of the action. In the above mentioned action of cutting the object with the ax, an act of lifting the ax corresponds to the first act. Following the first act, the second act constitutes an essential portion of the action and includes an act affecting the object. Thus, performing the second act before verification of the possibility of the performance would result in an inconsistent situation if the action is not permitted. On the other hand, the first act does not include any act having effect on the object, for example, and thus does not include any act that may cause inconsistencies. In the case of the above mentioned action of cutting the object with the ax, the act of cutting is equivalent to the second act.

Figure 5:
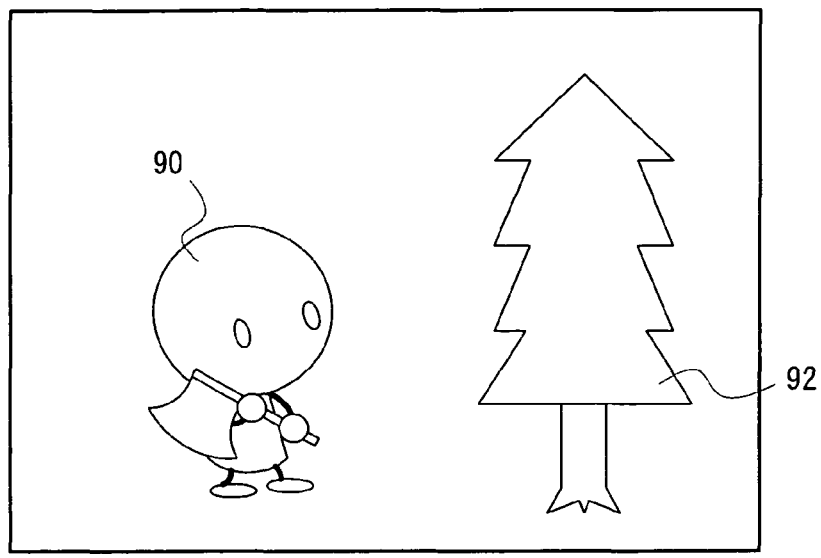
FIG. 5 is an illustrative view showing one example of a game screen.

FIG. 5 shows one example of game screen for the above mentioned action of cutting the wood object with an ax. The game screen presents a player character 90 and a wood object 92. The player can allow the player character 90 to perform the action of cutting the wood object 92 by performing a predetermined operational input (e.g. manipulation of the operating switch 20*d*) in the state where the wood object 92 exists within a range of predetermined distance from the player character 90. Since this action constitutes an event requiring an exclusive process, the child device must inquire the parent device about the possibility of performance of the action. Thus, the child device transmits to the parent device a request for permission to perform the action.

Figure 6:
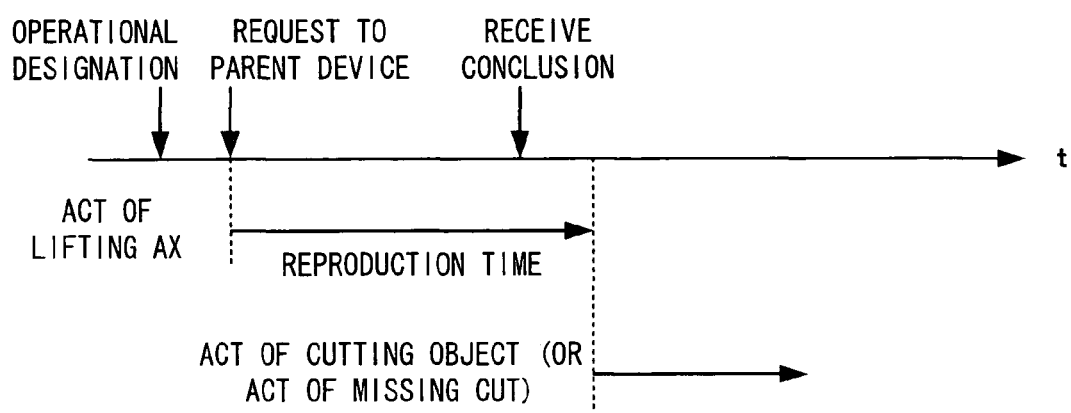
FIG. 6 in an illustrative view showing timing of a process in a case where a conclusion from a parent device is received during reproduction of a first act.
Figure 7:
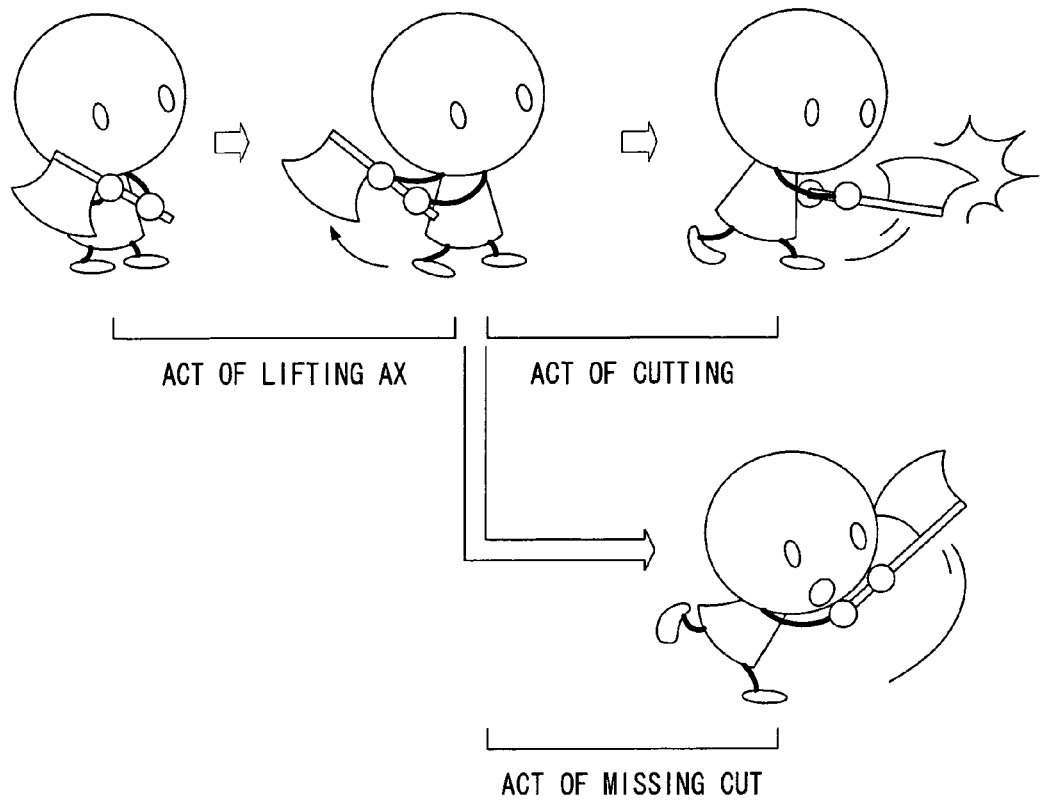
FIG. 7 is an illustrative view showing transition of the action of cutting a wood in a case where the conclusion from the parent device is received during reproduction of the first act.

When the child device has been given a predetermined operational designation and begun verifying the possibility of performance of the corresponding action, the reproduction of animation of the first act is started. More specifically, in the case with the above mentioned action of cutting the object with the ax as shown in FIG. 6, when the operational designation for performance of the action is detected and the request for permission to perform the action is transmitted to the parent device, the act of lifting the ax is reproduced as the first act. This allows an image of the player character performing the first act to be displayed on the LCD 12 or 14.

The animation data prepared for the first act has a longer reproduction time than a normal time lag in communications until a conclusion as to the request is received. As an example, the animation data has reproduction time of several tens of frames (one frame=1/60 second). On this account, it can be generally expected that the conclusion to the request is received from the parent device during reproduction of the first act. It is thus possible to accommodate a communication time lag by the reproduction of the first act.

When the conclusion as to the request is received during the reproduction of the first act, the second act is reproduced after the reproduction of the first act according to the received conclusion (permission or rejection of performance of the action), as shown in FIG. 6. If the above mentioned action of cutting the object with the ax is permitted, the act of cutting the object is reproduced as the second act affecting the object. On the other hand, if the performance is impossible (rejected), the act of missing the cut is reproduced as an act of failing to have effect on the object. With this, an image of the player character performing the second act according to the conclusion is displayed on the LCD 12 or 14.

Figure 8:
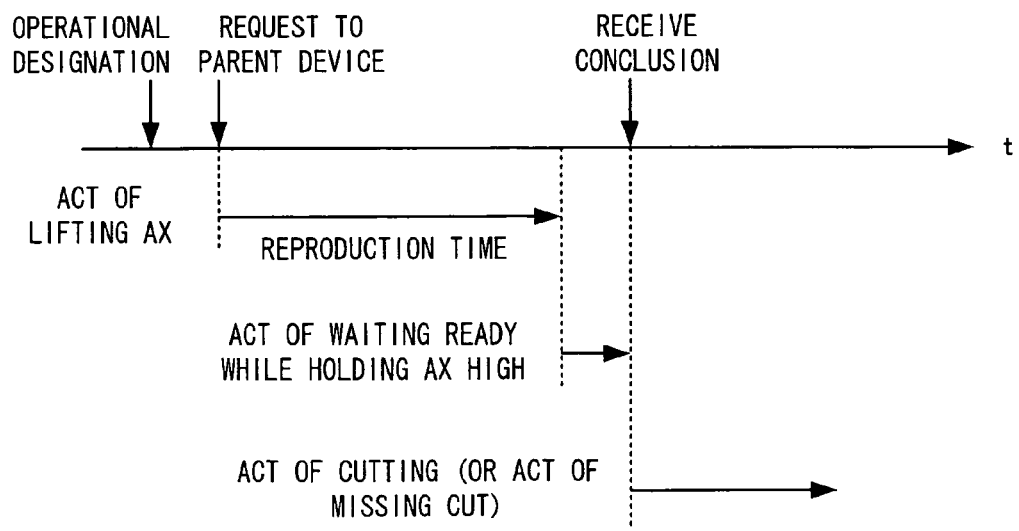
FIG. 8 is an illustrative view showing timing of a process in a case where no conclusion from the parent device is received during reproduction of the first act.
Figure 9:
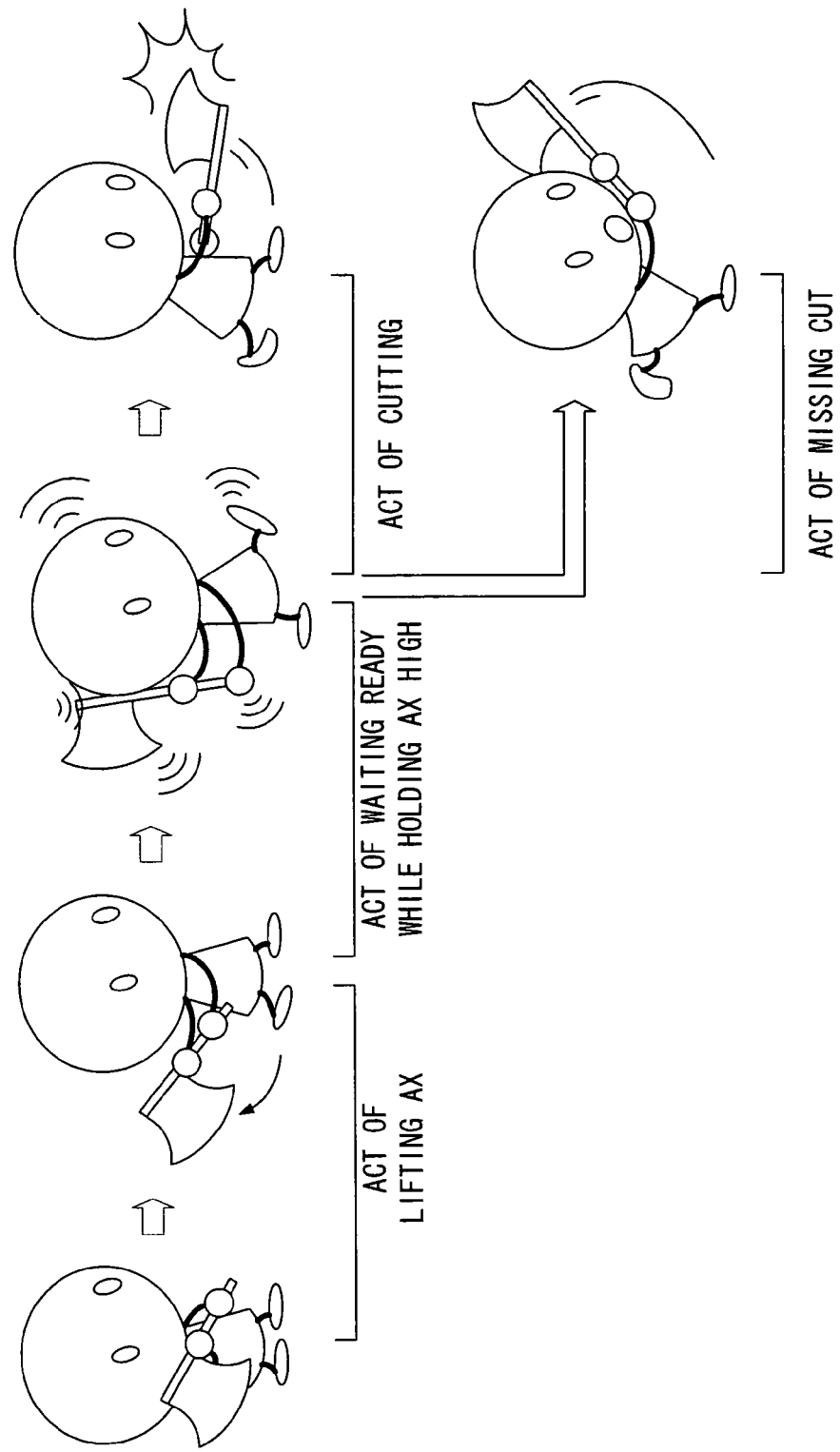
FIG. 9 is an illustrative view showing transition of the action for cutting a wood in a case where no conclusion from the parent device is received during reproduction of the first act.

However, if the conditions of communication are not good, there may arise a situation in which the reception of conclusion as to the request is delayed in excess of the normal communication time lag. To deal with that, animation data for displaying a third act linking the first act with the second act is further stored in this embodiment. The third act follows the first act and leads to the second act, and also is consistent with the first act and the second act, for example. In the case with the above mentioned action of cutting the object with the ax, the act of waiting ready while holding the ax up is equivalent to the third act. The third act is reproduced after and of reproduction of the first act if no conclusion as to the request is received during reproduction of the first ct, as shown in FIG. 8. Animation data prepared for the third act has predetermined length of reproduction time. The third act is repeatedly reproduced until the conclusion is received, for instance. This allows an image of the player character performing the third act to be displayed on the LCD 12 or 14, as shown in FIG. 9. For the reproduction of the third act, it is preferable to display an image showing some movement, if only a little, rather than a still image, so that the player can be informed that the action is being performed. In performing the above mentioned act of waiting ready while holding the ax up, the player character may shake the ax or his/her body or change facial expressions, for example, as shown in FIG. 9. Then, when the conclusion to the request is received during reproduction of the third act, the second act is reproduced according to the received conclusion (the permission or rejection of the performance), as indicated in FIG. 8 and FIG. 9.

Figure 10:
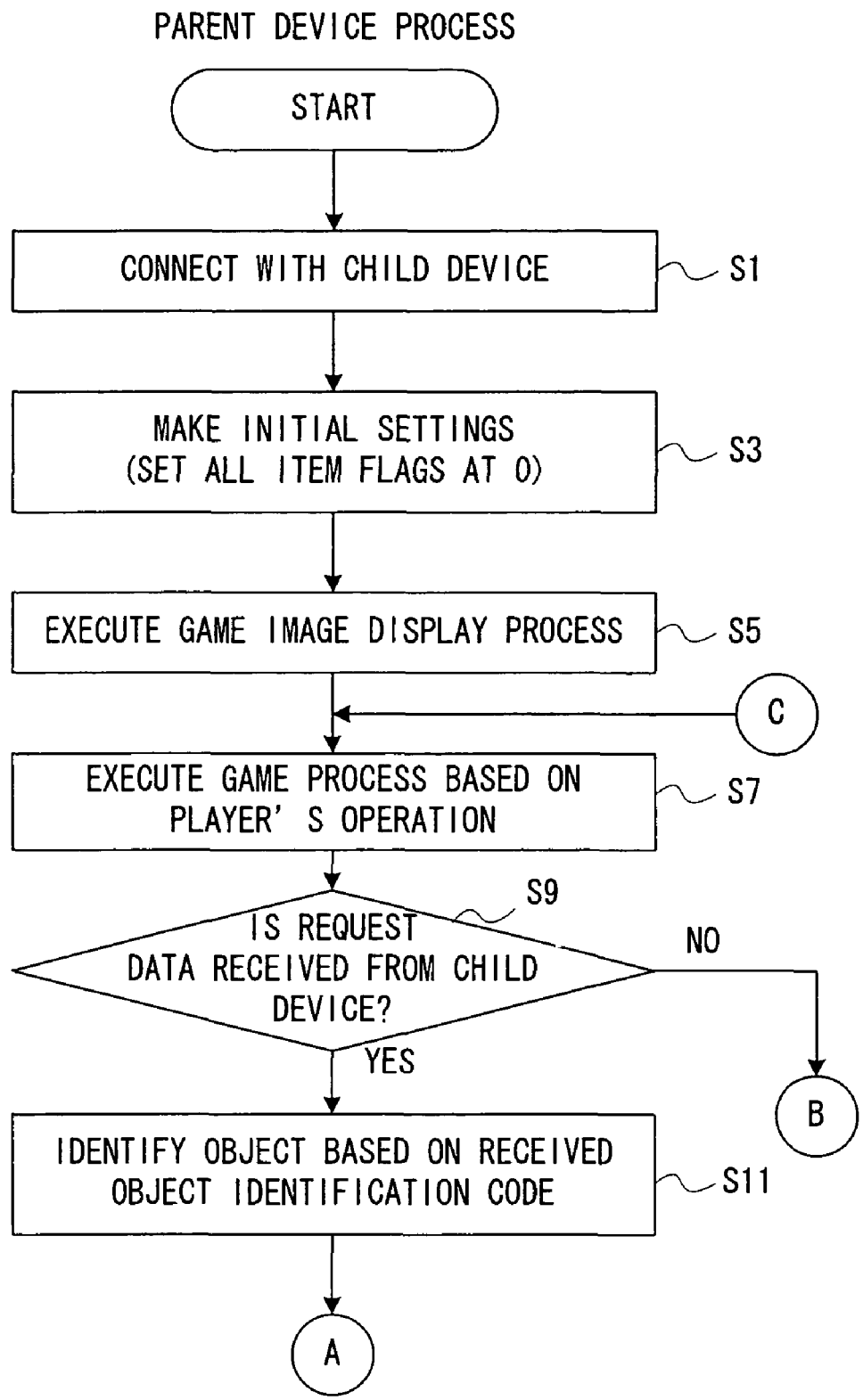
FIG. 10 is a flowchart showing a part of one example of operation of the game apparatus as a parent device.
Figure 11:
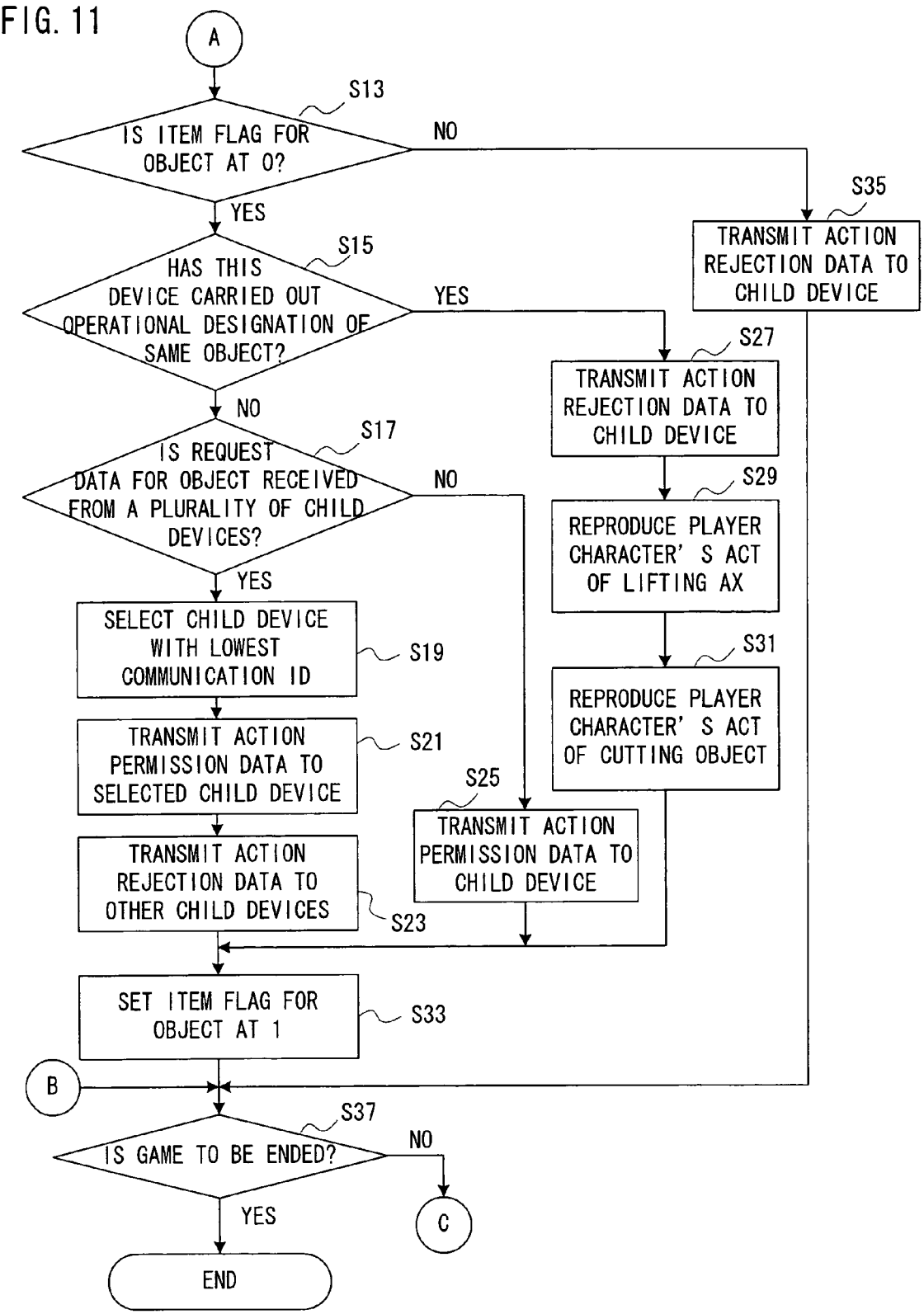
FIG. 11 is a flowchart continued from that in FIG. 10.

FIG. 10 and FIG. 11 present one example of operation of the game apparatus 10 serving as parent device. A CPU core 42 of the parent device executes a process of connecting with a child device in a step SI of FIG. 10. For instance, the CPU core 42 searches for a child device existing within the communicable area and establishes connection with the child device. The CPU core 42 stores data required for communications in a predetermined area of the RAM 48, such as a communication ID of the connected child device.

Next, the CPU core 42 makes initial settings in a step S3. For example, the CPU core 42 sets 0 to all the item flags in the flag storage area 84.

Subsequently, the CPU core 42 executes a game image display process in a step S5. For example, the CPU core 42 uses the GPU 50 or GPU 52 and the LCD controller 60, etc. to generate game image data based on the data in the image data storage area 74, and displays the game image on the LCD 12 or the LCD 14.

In a step S7, the CPU core 42 executes a game process according to the player's operation. More specifically, the CPU core 42 takes into the RAM 48 operational data from the operating switch 20 or touch input data from the touch panel 22 via the I/F circuit 54, and makes the game progress based on the operational data or the touch input data, etc.

Subsequently, in a step S9, the CPU core 42 attempts to receive request data from the child device via the wireless communication part 64. The CPU core 42 then determines whether the request data transmitted from the child device is received or not. The request data transmitted from the child device is a request for permission to perform the action corresponding to a predetermined operational designation given to the child device, for example. The request data includes the communication ID of the child device, the identification code of the object and a request for the performance of a predetermined action on the object, etc., and is stored in the RAM 48.

If "YES" in the step S9, that is, if the request data is received from the child device, the CPU core 42 stores the received data in the RAM 48, and extracts the identification code of the object from the received request data and identify the object as a subject of the action in the child device based on the object identification code in a step S11.

For this embodiment, the shown flowchart is limited to the case in which the action of cutting the object with the ax is specified. Furthermore, it is possible to extract information for designating a requested action from the received request data and identify the action specified at the child device in the step S11.

Upon completion of the step S11, the process goes to a step S13 of FIG. 11. On the other hand, if "NO" in the step S9, the process moves to a step S37 of FIG. 11.

In the step S13 of FIG. 11, the CPU core 42 determines whether the item flag for the object corresponding to the received object identification code is set at 0 or not. If "YES" in the step S13, that is, if it is possible to make the action affect the object and permit the request, the CPU core 42 determines in a step S15 whether or not this device itself designated the operation to be performed on the same object at the same time (within the same frame time) as the time when it was determined in the step S9 that the request data from the child device had been received. For example, the CPU core 42 calculates a distance between this device's own player character and the object corresponding to the received object identification code, based on the positional data of the player character and the positional data of the object, and determines whether the distance falls within a predetermined range or not. Moreover, the CPU core 42 determines whether a predetermined operation ahs been specified or not based on operational data from the operating switch 20 or touch input data from the touch panel 22.

If "NO" in the step S15, the CPU core 42 determines in a step S17 whether or not request data with respect to the object has been received at the same time from a plurality of child devices. If "YES" in the step S17, that is, if a predetermined operational designation of the action to be performed on the same object has been made from the plurality of child devices at the same time, the CPU core 42 selects a child device whose communication ID is a lowest number, for example, as child device to be given permission for the request, in a step S19. The CPU core 42 also decides to reject the requests from the other child devices. In this manner, if the child device with the lowest communication ID is to be given permission, it is easy to decide or detect the permitted child device. Additionally, the manner in which the child device is selected can be changed as appropriate and one child device may be selected at random, for instance.

Then, in a step S21, the CPU core 42 transmits action permission data for permitting the performance of the requested action via the wireless communication part 64 to the selected child device. The CPU core 42 transmits action permission data for rejecting the performance of the requested action via the wireless communication part 64 to the unselected child devices, in a step S23.

In this manner, if the same request is received from a plurality of child devices, only one of them is given permission for the request. Each of the child devices makes difference in the second act of the player character between when receiving the conclusion of permission and when receiving the conclusion of rejection, and it is thus possible to make the action consistent among the plurality of child devices, thereby ensuring the exclusivity of the event.

On the other hand, if "NO" in the step S17, that is, if the request data for the object is received from only one child device, the CPU core 42 transmits action permission data to the child device via the wireless communication part 634 in a step S25.

In addition, if "YES" in the step S15, that is, if the reception of the request data from the child device and the predetermined operational designation of the action have taken place with respect to the same object within the same frame period, the parent device is given a higher priority in this embodiment, for example. Also, the CPU core 42 decides to reject the request from the child device. More specifically, the CPU core 42 transmits action rejection data to the child device via the wireless communication part 64 in a step S27. In addition, in a step S29, the CPU core 42 uses the GPU 50 or 52 and the LCD controller 60, etc. to reproduce the player character's act of lifting the ax based on the animation data fro the act of lifting the ax in the image data storage area 74, and displays the moving image on the LCD 12 or 14. Upon completion of reproduction in the step S29, the CPU core 42 reproduces the player character's act of cutting the object based on the animation data for the act of cutting in the image storage area 74, and displays the moving image on the LCD 12 or 14 in a step S31. In this manner, when the parent device performs a predetermined operation, if a request for the same operation is made from the child device, the child device's request is rejected and the parent device's operation is carried out by priority. This makes it possible to select easily the game apparatus 10 to be given permission and also provide consistency in action among a plurality of game apparatuses 10, thereby ensuring exclusive properties in events.

In another embodiment, the child device may be given a higher priority. Alternatively, any one of all the game apparatuses 10 including the parent device and the child device may be selected. The selection may be made in any manner, and for example, the game apparatus 10 with the lowest communication ID may be selected or any one game apparatus 10 may be selected at random. Moreover, in still another embodiment, considering a time lag in communications between the parent device and the child device or between a plurality of child devices, the determination of step S15 or step S17 may be made under a condition that the parent device's operation and the child device's request have taken place at the almost same time (within several frame times). For example, the CPU 42 may determine in the step S15 whether or not the parent device has designated a predetermined operation (or the request data has been received from the child device) within several frame times from the frame at which the request has been received from the child device (or the frame at which the parent device designated a predetermined operation) with respect to the same object, and may determine in the step S17 whether or not the request data has been received from another child device within several frame times from the frame at which the request data was firstly received from the aforesaid child device with respect to the same object.

Upon completion of step S23, step S25 or step S31, the CPU core 42 sets the item flag corresponding to the object in the item flag storage area 84 at 1 in a step S33. With this, it is recorded that the predetermined action ahs affected the object.

On the other hand, if "NO" in the step S13, that is, if it is impossible to make the action affect the object, the CPU core 42 transmits action rejection data to the child device via the wireless communication part 64 in a step S35.

Upon completion of step S33 or step S35, the CPU core 42 determines in a step S37 whether or not to end the game. If "NO" in the step S37, the process returns to the step S7 of FIG. 10. In contrast to that, if "YES", the CPU core 42 terminates the game process.

Figure 12:
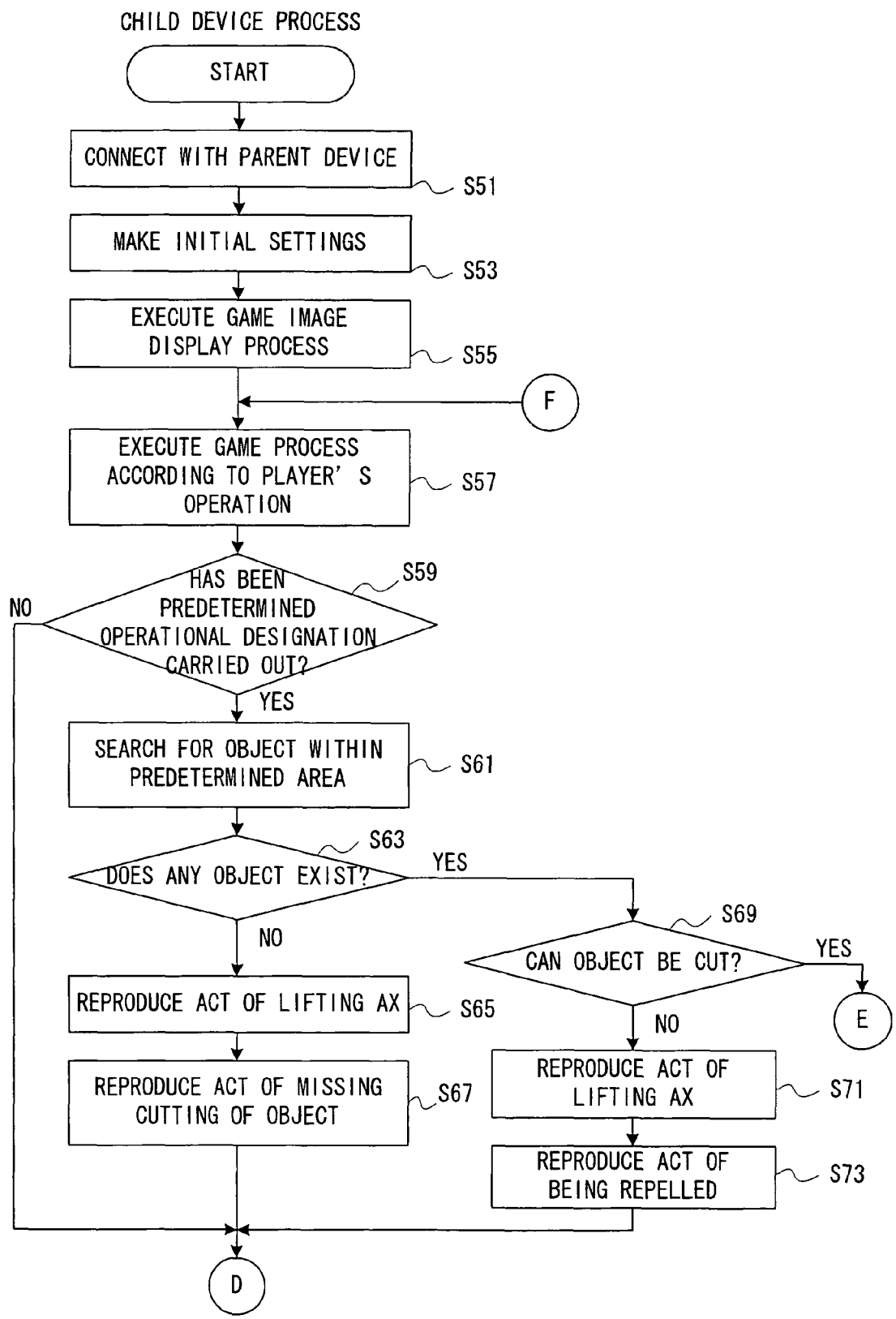
FIG. 12 is a flowchart showing a part of one example of operation of the game apparatus as a child device.
Figure 13:
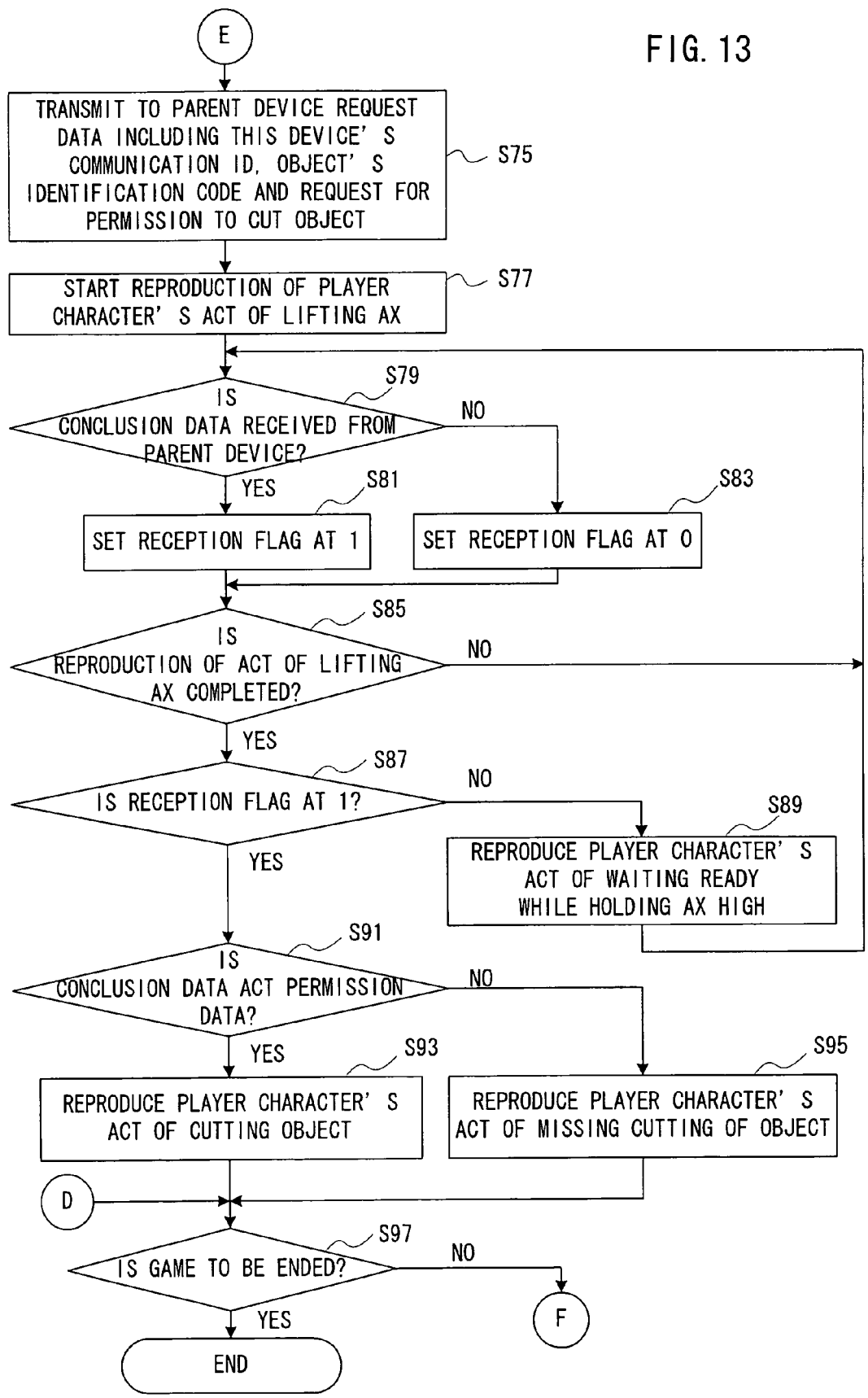
FIG. 13 is a flowchart continued from FIG. 12.

FIG. 12 and FIG. 13 show one example of operation of the game apparatus 10 serving as a child device. In a step S51 of FIG. 12, the CPU core 42 of the child device executes a process of connecting with the parent device. For example, the CPU core 42 searches for any parent device existing within a communicable area and establishes connection with the parent device. The CPU core 42 stores data required for communications such as the communication ID of the connected parent device and the communication ID of this device, in a predetermined area of the RAM 48.

Next, the CPU core 42 makes initial settings in a step S53. For example, the CPU core 42 sets 0 to the reception flag 86 in the flag storage area 78.

Subsequently, the CPU core 42 executes a game image display process in a step S55. For example, the CPU core 42 uses the GPU 50 or GPU 52 and the LCD controller 60, etc. to generate game image data based on the data in the image data storage area 74, and displays the game image on the LCD 12 or the LCD 14.

In a step S57, the CPU core 42 executes a game process based on the player's operation. More specifically, the CPU core 42 obtains in the RAM 48 via the I/F circuit 54 operational data from the operating switch 20 or touch input data from the touch panel 22, and makes the game progress based on the operational data or the touch input data, etc.

Then, in a step S59, the CPU core 42 determines whether or not a predetermined operation has been designated on the basis of the obtained operational data from the operating switch 20 or touch input data from the touch panel 22. For example, the CPU core 42 determines whether the act of swinging the ax has been designated or not, that is, the operation switch 20*d* has been manipulated.

If "YES" in the step S59, the CPU core 42 searches for any object within a predetermined area in a step S61. For example, the CPU core 42 calculates a distance between the object(s) and the player character from the positional data of the object(s) and the player character in the game space. Then, the CPU core 42 detects any object from which the distance to the player character is within a predetermined range, and stores the identification code of the object.

In a succeeding step S63, the CPU core 42 determines whether or not there exists any object within the predetermined area. If "NO" in the step S63, this means that no object exists within an area at the distance to which the effect of the action extends, and thus the CPU core 42 uses the GPU 50 or 52 and the LCD controller 60, etc. in a step S65 to reproduce the player character's act of lifting the ax, based on the animation data for the act of lifting the ax in the image data storage area 74, and displays the moving image on the LCD 12 or 14. When the reproduction of act of lifting the ax has been completed, the CPU core 42 reproduces the player character's act of missing the cut according to the animation data for the act of missing the cut in the image data storage area 74, and displays the moving image on the LCD 12 or 14.

On the other hand, if "YES" in the step S63, that is, if some object exists within the area at the distance to which the effect of the action extends, the CPU core 42 determines in a step S69 whether the object can be cut or not. For example, the CPU core 42 determines whether or not the object has an attribute that it van be cut within the ax held by the player character, based on table data indicating the attributes of individual objects stored in the RAM 48.

If "NO" in the step S69, that is, if the object cannot be cut, the CPU core 42 reproduces the act of lifting the ax in a step S71, as in the case with the above mentioned step S65. Then, in a step S73, the CPU core 42 reproduces the player character's act when his/her ax is being repelled, based on the animation data for the act of being repelled in the image data storage area 74, and displays the moving image on the LCD 12 or 14.

On the other hand, if "YES" in the step S69, that is, if the object can be cut, the process moves to a step S75 of FIG. 13. In addition, if "NO" in the step S59 or upon completion of step S67 or step S73, the process goes to a step S97 of FIG. 13.

In the step S75 of FIG. 13, the CPU core 42 generates request data including the communication ID of this device, the identification code of the object and a request for permission to perform a predetermined action on the object, and transmits the request data to the parent device via the wireless communication part 64. For this embodiment, a description is given only as to the case in which cutting the object is employed as the action, and thus the request for the permission to cut the object is transmitted.

Then, in a step S77, the CPU core 42 uses the GPU 50 or 52 and the LCD controller 60, etc. to start the reproduction of the player character's act of lifting the ax (the first act) based on the animation data for the act of lifting the ax in the image data storage area 74, and displays the moving image on the LCD 12 or the LCD 14.

Subsequently, in a step S79, the CPU core 42 attempts to receive conclusion data from the parent device via the wireless communication part 64. Then, the CPU core 42 determines whether or not the conclusion data has been received from the parent device. If "YES" in the step S79, that is, if the conclusion data has been received, the CPU core 42 stores the received data in the RAM 48, and stores the number 1 in the reception flag storage area 86 to set the reception flag at 1 in a step S81. On the other hand, if "NO" in the step S79, that is, if no conclusion data is yet received, the CPU core 42 sets 0 to the reception flag in a step S83.

Upon completion of step S81 or step S83, the CPU core 42 determines in a step S85 whether the reproduction of act of lifting the ax started in the step S77 ahs been completed or not. If "NO" in the step S85, the CPU core 42 returns to the step S79 to repeat the process.

On the other hand, if "YES" in the step S85, that is, when the reproduction of act of lifting the ax has been completed, the CPU core 42 determines in a step S87 whether the reception flag is set at 1 or not.

If "NO" in the step S87, that is, if the reproduction of the first act has been finished but no conclusion of permission or rejection of performance is yet received, the CPU core 42 uses the GPU 50 or 52 and the LCD controller 60, etc. to reproduce the player character's act of waiting ready while holding the ax high (the third act) based on the animation data for the act of waiting ready while holding the ax high in the image data storage area 74, and displays the moving image on the LCD 12 or 14. Then, the process returns to the step S79 to attempt the reception of the conclusion data from the parent device.

On the other hand, if "YES" in the step S87, that is, if the conclusion of permission or rejection of performance has been received from the parent device, the CPU core 42 determines in a step S91 whether the received conclusion data is action permission data or not. More specifically, the CPU core 42 determines whether the conclusion data indicates permission or rejection of performance of the predetermined action.

If "YES" in the step S91, it is possible to perform the action on the object and thus the CPU core 42 uses the GPU 50 or 52 and the LCD controller 60, etc. to reproduce the player character's act of cutting the object (the second act) based on the animation data for the act of cutting the object in the image data storage area 74 and displays the moving image on the LCD 12 or 14 in a step S93. On the other hand, if "NO" in the step S91, it is impossible to perform the action on the object and thus the CPU core 42 reproduces in a step S95 the player character's act of missing the cut (the second act) and displays the moving image on the LCD 12 or 14, as in the case with the above mentioned step S67.

Upon completion of step S93 or step S95, the CPU core 42 determines in a step S97 whether or not to end the game. If "NO" in the step S97, the process returns to the step S57 of FIG. 12. On the other hand, if "YES" in the step S97, the CPU core 42 ends the process.

According to this embodiment, while an inquiry is made to the parent device about the possibility of performance of an action according to the player's operational designation, the player character performs the first act in the action, which ahs no effect on the object. After reception of a conclusion from the parent device, the player character performs the second act following the first act according to the conclusion. This makes it possible to maintain consistency between the player's operation and the player character's action and also accommodate a time lag generally assumed in carrying out communications. Accordingly, even in the case of an exclusive event, it is possible to avoid such a situation in which the player character pauses his/her action waiting for the parent device's conclusion, thereby offering a communication game without causing the player to feel discomfort.

Also, when no conclusion is received from the parent device even after completion of the first act, the player character performs the third act in conformity with the first act and the second act until the conclusion is received. Thus, it is possible to maintain consistency between the player's operation and the player character's action even if a time lag increases due to a deterioration in communication state.

For the above mentioned embodiment, as an example of exclusive event, a description is given as to the case in which the player character performs a predetermined action on the object in the game space shared by a plurality of game apparatuses. Alternatively, the exclusive event may be an event for performing a predetermined action not accompanied with any object. For example, the exclusive event may be an event in which, when one character performs a specific action defined in such a manner that only he/she is allowed to perform only once at a predetermined place of the shared game space, values of his/her attributes including physical strength and lifetime, etc. are restored or increased.

Moreover, for each of the above described embodiments, a description is provided as to the case in which one of a plurality of tame apparatuses 10 constituting a communication game system serves as parent device and the remaining game apparatus serve as child devices. As an alternative in another embodiment, the communication game system may be composed of a server serving as the aforesaid parent device and the game apparatuses 10 serving as the aforesaid child devices. In this case, the child devices may perform a communication game with the server via access points and networks or by directly carrying out wireless communications.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program for a game apparatus serving as a child device in a communication game system including a parent device and at least one child device communicating with a display device, wherein said child device comprises a first storage device for storing data for displaying on the display device a game image containing a player character operated by a player, said game program allows a processor of said child device to execute:

a first operating state determination operation to determine whether or not a predetermined operational designation has been carried out by said player;

a first transmission operation of, when it has been determined in said first operating state determination operation that said predetermined operational designation has been carried out, transmitting to said parent device a request for permission to perform an action corresponding to the predetermined operational designation;

a first act processing operation to display on the display device an image of said player character performing a first act according to said predetermined operational designation and before a conclusion transmitted from said parent device has been received according to said request transmitted in said first transmission operation;

a first reception operation to receive the conclusion transmitted from said parent device according to said request transmitted in said first transmission operation; and a second act processing operation that, after said conclusion is received in said first reception operation, displays on the display device an image of said player character performing a second act according to the conclusion.

2. A non-transitory storage medium storing a game program according to claim 1, wherein said game program allows the processor of said child device to further execute:

a reception determination operation to determine whether or not said conclusion has been received from said parent device by the time said first act has been completed, and a third act processing operation that, upon completion of said first act in said first act processing operation, when it has been determined in said reception determination operation that said conclusion has not been received, displays on the display device an image of said player character performing a third act in conformity to said first act and said second act until the conclusion is received.

3. A non-transitory storage medium storing a game program according to claim 1, wherein said second act includes an act corresponding to permission being granted when the conclusion is indicative of permission and an act corresponding to rejection when the conclusion is indicative of rejection.

4. A game apparatus serving as a child device in a communication game system including a parent device and the child device, the game apparatus comprising:

a first non-transitory storage device storing data for displaying the game image containing a player character operated by a player;

a first operating state determination logic unit determining whether or not a predetermined operational designation has been carried out by said player;

a first transmission logic unit for, when said first operating state determination means has determined that said predetermined operational designation has been carried out, transmitting to said parent device a request for permission to perform an action corresponding to the predetermined operational designation;

a first act processing logic unit displaying an image of said player character performing a first act according to said predetermined operational designation by the time a conclusion transmitted from said parent device has been received according to said request transmitted in said first transmission logic unit;

a first reception logic unit receiving the conclusion transmitted from said parent device according to said request transmitted in said first transmission logic unit; and a second act processing logic unit for, after said conclusion has been received in said first reception logic unit, displaying an image of said player character performing a second act according to the conclusion.

5. A communication game system containing a parent device and at least one child device, wherein said at least one child device includes:

a first non-transitory storage logic unit to store data for displaying on a first display device in communication with the at least one child device a game image containing a player character operated by a player;

a first operating state determination logic unit to determine whether or not a predetermined operational designation has been carried out by said player;

a first transmission logic unit for, when it is determined in said first operating state determination logic unit that said predetermined operational designation has been carried out, transmitting to said parent device a request for permission to perform an action corresponding to the predetermined operational designation;

a first act processing logic unit to display on the first display device an image of said player character performing a first act according to said predetermined operational designation by the time a conclusion transmitted from said parent device has been received according to said request transmitted in said first transmission logic unit;

a first reception logic unit to receive the conclusion transmitted from said parent device according to said request transmitted in said first transmission logic unit; and a second act processing logic unit for, after said conclusion has been received in said first reception logic unit, displaying on the first display device an image of said player character performing a second act according to the conclusion, and wherein said parent device includes:

a second reception logic unit to receive the request from said at least one child device;

a permission determination logic unit determining whether or not to give permission to said request received in said second reception logic unit, and a second transmission logic unit transmitting to said child device the conclusion determined in said permission determination logic unit.

6. A communication game system according to claim 5, wherein said child device further includes:

a reception determination logic unit determining whether or not said conclusion has been received from said parent device by the time said first act has been completed, and a third act processing logic unit for, upon completion of said first act in said first act processing logic unit, when in said reception determination logic unit determines that said conclusion has been not received, displaying on the display device an image of said player character performing a third act in conformity to said first act and said second act until the conclusion is received.

7. A communication game system according to claim 5, wherein when in said second reception logic unit receives a same request from a plurality of said at least one child devices in a case where permission can be given to the request, said permission determination logic unit selects a child device to be given the permission and decides to reject the request from the other child devices, said second transmission logic unit transmits a conclusion indicative of permission to the one of the at least one child devices selected in said permission determination logic unit and transmits a conclusion indicative of rejection to the other of the at least one child devices, and said second act processing logic unit displays on the display device an image of said player character performing an act that is different between when permission is received and when rejection is received.

8. A communication game system according to claim 7, wherein said parent device further includes a second storage device storing data for displaying a game image containing a player character operated by a player;

a second operating state determination logic unit determining whether or not said predetermined operational designation has been carried out by said player; and a fourth act processing logic unit for, when said second operating state determination logic unit has determined that said predetermined operational designation has been carried out, displaying on a display device in communication with the parent device an image of said player character performing said first act and said second act corresponding to said predetermined operational designation, and wherein when said second operating state determination logic unit determines that said predetermined operational designation has been carried out and in said second reception logic unit the same request is received as the predetermined operational designation, said permission determination logic unit rejects said received request, said second transmission logic unit transmits to said at least one child device a conclusion indicative of rejection determined in said permission determination logic unit, and said fourth act processing logic unit displays on the display device in communication with the parent device an image of said player character performing an act corresponding to the case in which said conclusion is indicative of rejection.

9. A non-transitory storage medium storing a game program to be executed by a game apparatus in a communication game system containing a plurality of game apparatuses and in which one of said game apparatuses serves as a parent device and at least another game apparatus serves as a child device, wherein said game apparatus comprises a non-transitory storage device storing data for displaying a game image containing a player character operated by a player, said game program allows a processor of said game apparatus serving as said child device to execute:

a first operating state determination operation to determine whether said player has carried out a predetermined operational designation or not;

a first transmission operation that, when it has been determined in said first operating state determination operation that said predetermined operational designation has been carried out, transmits to said parent device a request for permission to perform an action corresponding to the predetermined operational designation;

a first act processing operation to display on a display device in communication with the child device an image of said player character performing a first act according to said predetermined operational designation by the time a conclusion transmitted from said parent device has been received according to said request transmitted in said first transmission operation;

a first reception operation to receive the conclusion transmitted from said parent device according to said request transmitted in said first transmission operation; and a second act processing operation that, after said conclusion has been received in said first reception operation, displays on the display device an image of said player character performing a second act according to said conclusion, and wherein said game program allows the processor of said game apparatus serving as said parent device to execute:

a second reception operation to receive the request from said child device;

a permission determination operation to determine whether or not to give permission to said request received in said second reception operation; and a second transmission operation to transmit to said child device the conclusion determined in said permission determination operation.

10. A game control method for a game apparatus serving as a child device of a communication game system containing a parent device and at least one child device, said game apparatus comprising a first non-transitory storage device storing data for displaying on a display device in communication with the game apparatus a game image containing a player character operated by a player, including:

a first operating state determination operation to determine whether said player has carried out a predetermined operational designation or not;

a first transmission operation that, when it has been determined in said first operating state determination operation that said predetermined operational designation has been carried out, transmits to said parent device a request for permission to perform an action corresponding to the predetermined operational designation;

a first act processing operation to display on the display device an image of said player character performing a first act according to said predetermined operational designation by the time a conclusion transmitted from said parent device is received according to said request transmitted in said first transmission operation;

a first reception operation to receive the conclusion transmitted from said parent device according to said request transmitted in said first transmission operation; and a second act processing operation that, after said conclusion has been received in said first reception operation, displays on the display device an image of said player character performing a second act according to the conclusion.

11. A non-transitory storage medium storing a game program for a child game apparatus in communication with a parent game apparatus, wherein said child game apparatus comprises a first processor executing a game program stored in memory of the child game apparatus and said memory storing image data for displaying on a display device in communication with the child game apparatus a game image containing a player character controlled by a player operating an input device to the child game apparatus, said game program causes the first processor of said child device to:

determine whether a predetermined operational designation has been inputted by said player to the input device;

upon the determination of an input of said predetermined operational designation, transmitting to said parent device a request for permission to perform an action corresponding to said predetermined operational designation;

displaying on the display device an image of said player character performing a first act according to said predetermined operational designation;

upon receiving from the parent device a conclusion response to the request, displaying on the display device an image of said player character performing a second act according to the conclusion.

12. A non-transitory storage medium storing a game program according to claim 11, wherein said game program causes the processor of said child game apparatus to further:

determine whether said conclusion response has been received from said parent device before a completion of said first act, and upon the completion of said first act prior to reception of the conclusion response, displaying on the display device an image of said player character performing a third act in conformity to said first act and said second act until the conclusion is received.

* * * * *